Patented May 11, 1926.

1,584,151

UNITED STATES PATENT OFFICE.

GENZO SHIMADZU, OF KAMIKYO KU, KYOTO, JAPAN.

PROCESS OF MANUFACTURING LEAD OXIDE.

No Drawing.   Application filed April 18, 1924. Serial No. 707,509.

This application is a continuation in part of application Number 431,473, filed December 17, 1920.

This invention relates to improvements in the process of manufacturing lead oxides and consists in oxidizing fine lead suboxide powder intermingled with metallic lead powder by the initial application of heat and without fusing the lead suboxide. The object of this invention is to simplify the process thereby economizing the labour and expenses of manufacture, and at the same time to obtain lead oxides, such as litharge, red lead or the like, in a pure state and in a special form, best adapted for the purposes for which they are generally used.

There are known various processes of manufacturing lead oxides by oxidizing fine powder of lead, but in all these known processes, lead powder must either be continuously heated or treated with steam, or an oxidizing agent is used to accelerate the oxidation. Thus the work is troublesome, and the product is not pure.

Now, this invention removes all these drawbacks, and consists in taking pieces of metallic lead into a revolvable drum, and revolving the drum slowly at a rate of about twenty-five revolutions per minute, blowing the air into the drum all the while. Then the heat generated by friction and oxidation (within the drum) of the lead pieces will raise the temperature within the drum and maintain it at not less than 60° C. The friction too will form new metallic surface on the lead pieces, which as soon as formed will be converted into lead suboxide by the heat and the oxygen in the air. The film of lead suboxide thus formed will be reduced to powder by abrasion, but not by lead pieces striking against one another, like in the case of a common tube mill or ball mill. When the lead suboxide film is abraded off, a new metallic surface will be formed, which as soon as formed will be abraded off as before, thus continually producing fine powder of lead suboxide intermingled with metallic lead powder directly and in dry condition. The lead suboxide powder intermingled with metallic lead powder thus obtained is so fine and chemically active that if a lighted match be applied to part of its pile or a few drops of water be dropped on it, oxidation will instantly commence, igniting it briskly as if it were burning sulphur or such easily inflammable substance. Thus, if care be taken that the material does not fuse, the whole of it shall be instantly converted into powder of lead monoxide without supplying any more external heating or using any oxidizing agent other than air. And if fresh supply of lead suboxide powder be piled upon small remainder of the actually oxidizing lead suboxide powder, the ignition may be perpetually maintained.

The lead suboxide powder intermingled with metallic lead powder produced according to this invention is extremely fine, porous and spongy, its apparent specific gravity being not more than 1-3. It is chemically very active, sometimes starting spontaneous ignition in the air. If it comes into contact with water or moisture, it generates a great heat, and instantly turns into lead monoxide, lead hyroxide, basic lead hydroxide, or the like; and as it becomes red-hot by the reaction heat rising, it becomes chemically very reactive. It is very reactive, but is not unstable like lead suboxide powder manufactured chemically by reducing lead oxalate, and is therefore very convenient to handle industrially as a material.

Sometimes lead suboxide intermingled with a small proportion of metallic lead powder, may be left exposed to the atmosphere from two to four weeks, and the powder will be converted into litharge, being oxidized directly by the oxygen in the air.

The litharge thus obtained can be turned into red lead, as is commonly practiced, by heating the same in a furnace, or a pan at a temperature not more than 500° C.

Thus this process is economical, because heat is necessary only to start oxidation at a part of the material, and the reaction heat does the work of oxidizing the rest. It is very simple and saves much labour. Also, as it is simple there is little chance of impurities getting into the product. If we select pure lead pieces for material, we shall be able to obtain pure powder not containing any other metal, from which we can manufacture litharge and red lead purer than those now on the market. Moreover, the product obtained by my process has different properties from lead oxides obtained by known processes, that is, by continuous heating or the use of a chemical agent to accelerate oxidation. It is more porous and lighter in the apparent specific gravity, such properties depending upon fineness of the lead suboxide powder which can be regulated at will. Thus, the litharge or red lead manufactured according to my process is an ideal material as the paste for lead accumulators on account of its purity and the properties mentioned above. Used as paint, it has a higher consistency and extensibility and is rich in covering power.

I claim:

1. The process of forming finely divided oxygenated lead compounds which comprises treating a finely divided chemically reactive powder comprising a major portion of lead suboxide with an oxidizing substance.

2. The process of forming a finely divided oxygenated lead compound which comprises treating a finely divided chemically reactive powder comprising a major portion of lead suboxide with an oxidizing substance, and maintaining the reaction by the evolved heat of reaction.

3. The process of forming a finely divided oxygenated lead compound which comprises treating a finely divided chemically reactive powder comprising a major portion of lead suboxide with an oxygen containing substance and continuing the reaction by the evolved heat of reaction.

4. The method of forming finely divided lead oxide which comprises treating a finely divided chemically reactive powder comprising a large proportion of lead suboxide and a minor proportion of metallic lead with air, and continuing the reaction by the evolved heat of oxidation.

5. The method of forming a finely divided oxygenated lead compound which comprises contacting finely divided chemically reactive powder comprising a large proportion of lead suboxide with moisture and continuing the reaction by the evolved heat of reaction.

6. The process of forming higher oxides of lead which comprises treating a finely divided chemically reactive powder comprising a major portion of lead suboxide with an oxidizing substance to form lead monoxide, and oxidizing said lead monoxide to such higher oxides of lead.

7. The process of forming higher oxides of lead which comprises treating a finely divided chemically reactive powder comprising a major portion of lead suboxide with an oxidizing substance, maintaining the reaction by the evolved heat of reaction to form lead monoxide and oxidizing said monoxide to said higher oxides of lead.

In testimony whereof I have affixed my signature.

GENZO SHIMADZU.